Patented July 12, 1938

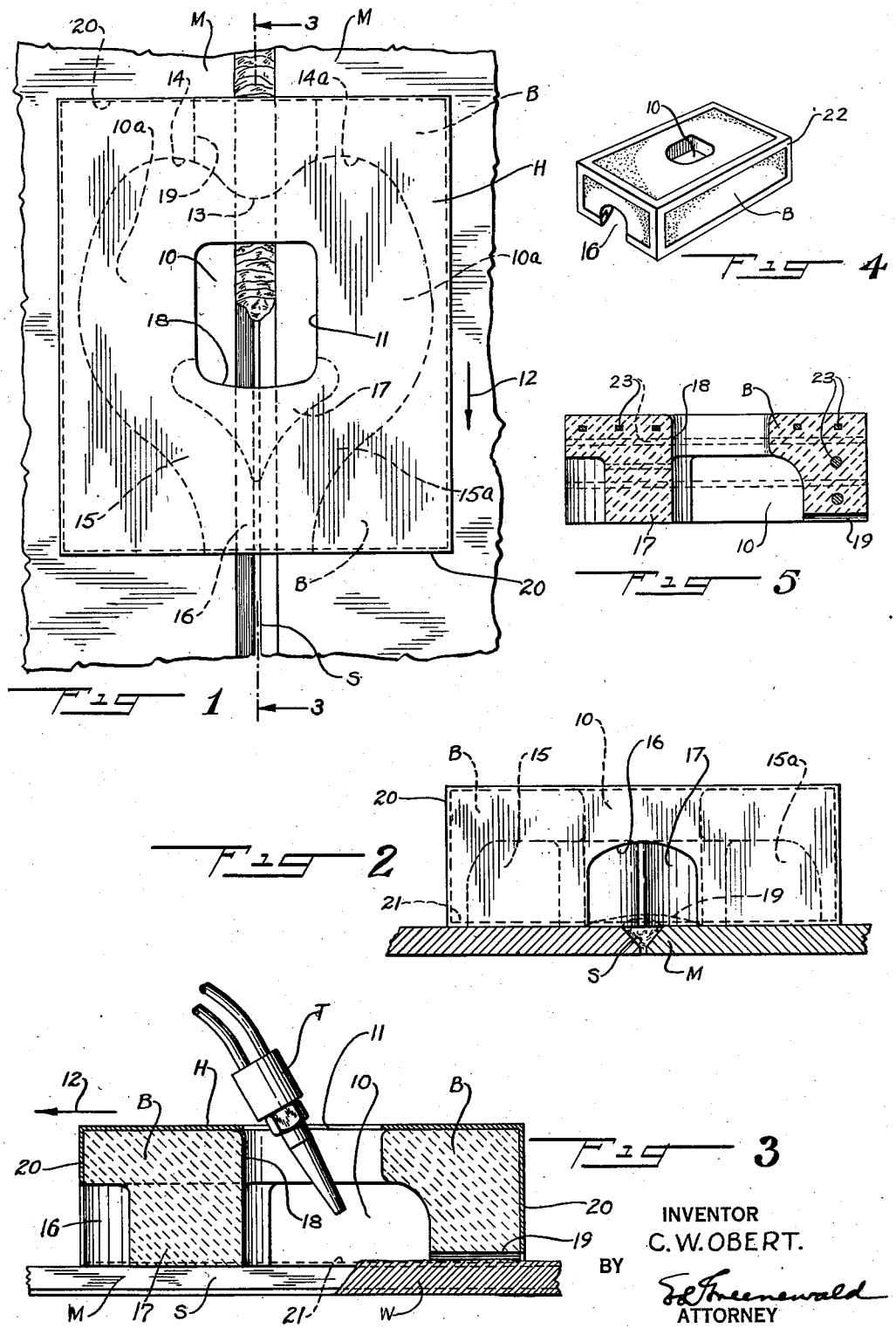

2,123,612

UNITED STATES PATENT OFFICE 2,123,612

HEAT ECONOMIZER

Casin W. Obert, Mount Vernon, N. Y., assignor, by mesne assignments, to Union Carbide and Carbon Corporation, a corporation of New York Application February 17, 1934, Serial No. 711,660

21 Claims. (Cl. 113—59)

This invention relates to a hood or economizer for conserving heat. More specifically, the invention relates to the control and conservation of heat in practices such as gas fusion welding, and to the construction of apparatus to be used to this end.

The invention is an improvement upon that of S. W. Miller disclosed in his Patent No. 1,805,181, granted May 12, 1931 and that of M. J. Wall disclosed in his Patent No. 1,902,051, granted March 21, 1933. In the practice of processes of this character and in the employment of apparatus for carrying out the processes as heretofore known, any approach to the complete conservation and efficient application of heat in a desired region has been accomplished, if at all, with great difficulty. Also, such apparatus as has been provided to this end has been either too bulky to permit facile manipulation or has afforded such insufficient and otherwise unsatisfactory vision of the region being heated as to prevent intelligent and effective manipulation of the heating means in controlling the heat conditions in this region. Further, much of the heat provided has been wasted due to the operator's inability, with the apparatus available, to so control gaseous currents set up by the heat as to prevent turbulence at the point of heat application and thereby insure steadiness and constancy thereof. In the ordinary practice of fusion welding, substantially all of the heat of the flame not radiated downward upon the metal is wasted. Much of this heat may be conserved by confining it within an enclosure surrounding the region of heat application but the greatest benefit cannot be attained without a concentration of this heat upon the specific region being heated. This has not heretofore been accomplished, and, in addition, a considerable amount of the heat supplied has been carried away by the gaseous currents set up at or around the welding point.

It is therefore an object of this invention to provide an improved heat economizer for use in applying heat to a region of desired heat benefit in practices such as fusion welding, whereby the heat supplied may be more completely conserved and effectively utilized than has heretofore been possible and without interfering with the visibility of the heated region and without employment of cumbersome and bulky apparatus; whereby the heat may be more completely and effectively concentrated upon the region of employment; whereby turbulence in the currents of gas produced by application of the heat may be prevented; and whereby such gaseous currents may be so routed from the point of heat application as to most effectively employ the heat thereof in carrying out the process.

Accordingly, heat may be applied to the work in the region of desired high heat application by means of a welding blowpipe or other suitable high temperature heating means and suitably confined about this region, as by an enclosure with refractory walls. The heat which is not radiated from the heating means directly upon this region may be reflected or reradiated so as to be focused and concentrated thereupon. Turbulence in the gaseous currents set up by the application of heat to the point of welding may be prevented by interposing within the currents adjacent the point of high heat application, means for dividing these currents into a plurality of streams and by providing means for routing these streams through stream line channels to an outlet. These channels may be so located that the gaseous currents will be eventually passed over a region to be subsequently subjected to the high temperature heat of the heating means in the progressive application thereof to the work thereby utilizing heat which would otherwise be wasted.

The apparatus employed in carrying out the welding process may comprise a hood of refractory material in association with high temperature heating means and the hood being provided with a chamber substantially closed on all sides and at the top except for an aperture sufficient for insertion of heating means and for adequate vision of the region being heated and open at the bottom. The chamber may be formed with a wide portion around the region of heat application to provide for rapid expansion of the gases and rapid removal thereof from the point of high heat application. To this end, stream line channels may be provided leading therefrom which may extend forwardly over a region to be subsequently heated to a high temperature. A vertically extending rib and a curved reflecting surface or surfaces may be provided in the chamber, the former so positioned as to divide the heated gases in the region of the point of welding and thereby prevent turbulence therein and the latter so that its focus will lie in this region. Likewise, all of the walls of the chamber forwardly of the reflecting surface may be curved or otherwise so shaped as to focus, so far as is practical, all heat radiated thereupon into the welding region.

Other objects and novel features of the invention will be apparent from the following specifications taken with the accompanying drawing, in which, Fig. 1 is a plan view of a hood constructed in accordance with this invention;

Fig. 2 is a front end view thereof; and

Fig. 3 is a longitudinal sectional therethrough on the line 3—3, Figs. 1 and 2.

Figs. 4 and 5 are views on a reduced scale compared with Figs. 1, 2, and 3, and showing variations in the reinforcement of the refractory block from that shown in Figs. 1, 2, and 3.

The hood H illustrated in the drawing as constituting one specific embodiment of the apparatus of the invention is shown as applied to welding a seam between metallic members M and comprises a block B of any suitable refractory material.

It is desirable that the refractory material selected should be such as will attain the best condition of incandescence when highly heated by the waste gases and heat radiated thereupon so as to provide the maximum efficiency in reflecting or radiating heat back into the welding region. A magnesite mixture with a suitable binder, such as a small percentage of "Albany" slip clay is found to be suitable for this purpose but the block may be of any other suitable material that will withstand the extreme concentration of heat applied in carrying out the process. The composition of Albany slip clay is approximately $SiO_2$ 56.6%; $Al_2O_3$ 14.8%; $Fe_2O_3$ 5.8%; CaO 5.7%; MgO 2.48%; $K_2O$ 3.23%; $Na_2O$ 1.07%; MnO 14%; $P_2O_5$ 15%; $H_2O$ 5.18%; miscellaneous 4.94%. In the place of magnesite, cerium oxide or other suitable refractory material may be used.

The block of refractory material is provided with a chamber 10 which is substantially enclosed on all sides and at the top except for an aperture or opening 11 designed for admission of suitable heating apparatus, such as a welding blowpipe T, into the chamber 10. This opening should also be of such size as to permit a clear unobstructed view of the region of heat application and to provide sufficient space for manipulation of the heating means in controlling the heat condition of the base metal in the welding region but should not be large enough to permit escape of any appreciable amount of the heat being applied to the base metal. The chamber 10 is open at the bottom and is provided with a wide expanse at 10a on either side of the point of welding. The rear wall of the chamber (considering the direction of movement that is indicated by the arrow 12 in Fig. 1) is provided with a ridge 13 extending vertically and in opposition to the point of heat application so as to divide the heated gases, immediately they are formed or set in motion, into currents which are directed thereby along the curved walls 14, 14a at the rear of the chamber in streams which are then directed forwardly along the side walls and into channels 15, 15a which unite in the channel 16 from which they are discharged.

The channel 16 is preferably so positioned as to overlie the seam S between the metallic members being united when the hood is in operating position on the work. Channels 15, 15a and 16 lead from the forward portion of chamber 10 and are likewise open at the bottom so that the full effect of the heat of the waste gases passing therethrough may be applied to the scarfed sides of the seam S to which the intense heat of the torch flame will be subsequently applied as the torch and hood are moved progressively along the seam.

The surfaces of channels 15, 15a as well as the inner surfaces of the chamber 10 proper are preferably stream lined so as to present minimum obstruction to the flow of gases therethrough. The inner walls of the channels 15, 15a comprise surfaces of a projection 17 which is preferably formed of refractory material constituting a part of the block B and extending downward from the top thereof. The sides of channels 15, 15a, are preferably in substantial parallelism.

The front wall 18 of the chamber 10, which is disposed opposite the region of intense heat application, is preferably concave on a curved line, the focal point of which lies in the region of intense heat application. In like manner the rear, side and top walls of the chamber 10, so far as is practical, may be concave or otherwise suitably shaped so that their foci will be within the region of intense heat application to the work.

Thus it will be seen, the construction and arrangement of the wall surfaces of the chamber are such as to effectively utilize not only the heat radiated directly from the source upon the welding region but also to reflect or reradiate that which would be otherwise waste heat into this region. Effectiveness of the apparatus is also enhanced by breaking up the usual turbulence at the point of heat application in the manner described above and thereby insuring a stable, unwavering flame.

The block B may be cut away on its bottom side to form the channel 19 positioned to bridge the finished weld W and afford escape of an amount of the heated gases sufficient to prevent too rapid cooling of the weld. In addition, by changing the position of the hood on the seam, the heated gases may be directed over any desired region, but the curved walls of the chamber will continue to focus heat radiated thereupon into the region of heat application.

The refractory block described above may be used without supporting structure, but the life thereof will be prolonged by encasing it in a box-like frame 20 capable of supporting it in case it becomes fractured. The frame as shown encases the block completely on top and sides and has a narrow flange 21 extending all the way round and overlapping the bottom of the block for a short distance. The box may be made of light sheet metal of any suitable thickness and may be of the construction shown in Figs. 1, 2, and 3 or of the skeleton construction shown at 22 in Fig. 4 such as to afford only a binder for the edges of the refractory block. The block may, as a further alternative, be reinforced in the manner shown in Fig. 5 by embedding suitable bars of metal 23 therein, either extending only in one direction or criss-crossed as shown.

While a single embodiment only of the invention is herein set forth with modifications as to reinforcing, it is to be understood that variations therein and other applications of the principles involved may be made in whole or in part within the scope of the invention to heating processes other than welding. It is also within the contemplation of the invention to use other heating means, such as an electric arc, instead of the torch T as shown in the drawing. I do not, therefore, wish to be limited to the specific disclosure herein made except as I shall be limited by the prior art and a broad interpretation of the appended claims.

I claim:

1. A hood for use in fusion welding comprising a block provided with a chamber substantially enclosed except at the bottom; said block being adapted to overlie a seam in an article to be welded; said chamber having a wall adapted to overlie the seam and provided with a projection for dividing heated gases into two streams and directing said streams along side walls of said chamber and away from such overlying wall; said side walls being shaped to provide expansion portions on either side of the seam through which the two streams flow; said overlying wall and said side walls being formed to provide a stream line flow of said streams so as to prevent turbulence.

2. A heat economizer comprising a block provided with a chamber substantially enclosed except for the bottom; said chamber having a rear wall adapted to direct heated gases forwardly in two streams along the side walls of said chamber, said rear and side walls being adapted to provide a stream line flow of the gases, and said side walls being adapted to provide an expansion portion to accommodate said streams; and said block having stream line channels leading from the chamber for the escape of said streams of gases from within the chamber.

3. A heat economizer comprising a block provided with a substantially enclosed chamber having an open bottom; a wall of said chamber being constructed and arranged for focusing heat upon a given region, and said block having a pair of channels formed therein leading from opposite sides of said wall for the escape of hot gases from said chamber in two streams, said channels converging toward each other and uniting at the edge of said block so as to direct said two streams in a single stream over a desired region.

4. A heat economizer comprising a block provided with a substantially enclosed chamber having an open bottom; said chamber having an expansion portion and an end wall provided with a projection for dividing the heated gases and directing said gases in two streams around the region of heat application so as to prevent turbulence therein, said expansion portion being adapted to accommodate said gas streams; and said block having at least one channel leading from the end wall opposite said first-mentioned end wall to permit the escape of such gases from said chamber.

5. A heat economizer comprising a block provided with a chamber substantially enclosed on the top and sides and open at the bottom; said block having a pair of channels leading from one end of said chamber converging together and uniting so as to direct heated gases over a desired region, and at least one channel leading from the other end of said chamber to direct heated gases over a second desired region.

6. A heat economizer comprising a block provided with a chamber substantially enclosed on the top and sides and open at the bottom; said chamber having an end wall provided with a reflecting surface having a focal point within the region of high heat application, and said block having channels leading from each side of such reflecting surface for conveying heated gases from said chamber.

7. A heat economizer comprising a block provided with a chamber substantially enclosed on the top and sides and open at the bottom; said chamber having an end wall provided with a vertical ridge for dividing the heated gases and directing such gases in two streams on either side of the region of intense heat application, so as to prevent turbulence in this region.

8. A heat economizer comprising a block provided with a chamber substantially enclosed on the top and sides and open at the bottom; said block having a pair of channels leading from either side of an end wall of said chamber, said channels converging towards each other and uniting to form a single channel for directing the heated gases from the chamber over a desired region.

9. A hood for preventing heat dissipation from a region of heat application to work comprising a refractory block having a chamber substantially closed at the top, ends, and sides and open at the bottom; said chamber having curved side and end walls adapted to focus and reflect radiant energy onto the region of heat application and a pair of channels, one leading from each side of an end wall of said chamber for conveying heated gases to a desired region of said work.

10. A hood for preventing heat dissipation from a region of heat application to work comprising a refractory block having an opening in the bottom thereof adapted to be positioned over said region of heat application; a wall formed in said block adjacent the rear of such opening adapted to divide hot gases flowing against said wall into two streams and to direct such streams forwardly from said wall along each side of said region of heat application, said wall being curved in such a manner as to focus reflected heat onto said region of heat application; and a supporting structure of sheet metal surrounding the block and overlapping a portion of the bottom thereof.

11. A heat economizer comprising a block having an opening in the bottom thereof adapted to be positioned over a region of heat application, and a wall formed in said block adjacent the rear of such opening adapted to divide hot gases flowing against said wall into two streams and to direct such streams forwardly from said wall along each side of said region of heat application, said wall being curved in such a manner as to focus reflected heat onto said region of heat application.

12. A hood for use in fusion welding comprising a block having an opening in the bottom thereof adapted to be positioned over a portion of a seam being welded; a wall formed in said block adjacent the rear of such opening adapted to direct hot gases flowing against said wall forwardly from said wall and along each side of such portion of the seam; and at least one channel formed in said block adapted to further direct such streams of gases over a portion of said seam forwardly of the portion being welded.

13. A hood adapted to be positioned over a welding seam comprising a block having an aperture in the top thereof leading into a chamber formed in said block, said aperture being adapted to permit access to a portion of said seam during welding, and said chamber having a rear wall adapted to divide hot streams of gas passing rearwardly of such portion of said seam into two streams and to deflect such streams forwardly, said chamber also having an enlarged portion laterally adjacent said aperture adapted to permit the passage of such deflected streams of gas to each side of the portion of said seam being welded.

14. A hood as set forth in claim 13, in which said block is provided with at least one channel leading from the forward wall of said chamber and adapted to direct such deflected gases forwardly from said chamber over a desired region.

15. A hood adapted to be positioned over a welding seam comprising a block having an aperture in the top thereof leading into a chamber, said aperture being adapted to permit access to a portion of said seam during welding, said chamber having a rear wall adapted to direct hot gases forwardly in two streams along each side of such portion of said seam, and said block having a pair of channels leading from each side of the forward wall of said chamber so as to direct the flow of the aforesaid two streams of gas forwardly from said chamber.

16. A hood as set forth in claim 15, in which said channels converge forwardly and merge at the forward end of said block so as to unite said two streams of gas into a single stream flowing forwardly over said seam.

17. A hood as set forth in claim 15, in which the rear and side walls of said chamber are formed so as to provide a stream line flow of gas forwardly from said rear walls and to each side of such portion of said seam.

18. A hood adapted to be positioned over a welding seam comprising a block having an aperture in the top thereof leading into a chamber formed in said block, said aperture being adapted to permit access to a portion of said seam during welding, said chamber having a rear wall adapted to deflect gases from such portion of said seam forwardly through said chamber and in two streams passing along each side of such portion of said seam, said block having a pair of forward channels formed therein leading from the front wall of said chamber and adapted to direct said two streams of gas forwardly from said chamber and merging adjacent the forward end of said block so as to cause said two streams to converge into a single stream directed over the unwelded portion of said seam forwardly of such portion being welded, and said block having a rearward channel leading rearwardly from said chamber so as to direct a portion of such gas rearwardly over the completed portion of said seam.

19. A hood as set forth in claim 18, in which the walls of said chamber and said forward channels are formed so as to provide a stream line flow of gas forwardly from the rear wall of said chamber and through said forward channels whereby turbulence of said gas in said chamber is substantially prevented.

20. A hood adapted to be positioned over a region of heat application comprising a block having an open bottom and an aperture in the top thereof leading into a chamber formed in said block, said aperture being adapted to permit access to said region during the application of heat, and said chamber having a rear wall formed so as to deflect hot streams of gas from the rearward portion of said chamber and forwardly along each side of said region of heat application, said rear wall and the side walls of said chamber being adapted to provide a stream line flow of such gases.

21. A hood as set forth in claim 20, in which said block is provided with at least one channel which is adapted to further direct such forwardly directed streams of gas over a desired region disposed forwardly of that region to which said aperture permits access.

CASIN W. OBERT.